US 6,582,125 B1

United States Patent
Lee et al.

(10) Patent No.: US 6,582,125 B1
(45) Date of Patent: Jun. 24, 2003

(54) SMART FOIL JOURNAL BEARING WITH PIEZOELECTRIC ACTUATORS

(76) Inventors: Yong Bok Lee, Ssangyong Apartment 101-1304, Chang-dong, Dobong-gu, Seoul 132-040 (KR); Chang Ho Kim, Yaksoo Apartment 116-1808, Shindang-dong 842, Jung-gu, Seoul 100-450 (KR); Nam Soo Lee, 340-273, Seokgwan-dong, Seongpuk-gu, Seoul 136-150 (KR); Tae Ho Kim, 351-12, Kimryangjang-dong, Yongin, Kyunggi-do 449-926 (KR)

( * ) Notice: Subject to any disclaimer, the term of this patent is extended or adjusted under 35 U.S.C. 154(b) by 0 days.

(21) Appl. No.: 09/912,946

(22) Filed: Jul. 25, 2001

(30) Foreign Application Priority Data

Jan. 19, 2001 (KR) .......................................... 2001-3306

(51) Int. Cl.⁷ ............................................... F16C 32/06
(52) U.S. Cl. ...................................... 384/106; 384/103
(58) Field of Search ................................ 384/103, 104, 384/105, 106

(56) References Cited

U.S. PATENT DOCUMENTS

| | | | |
|---|---|---|---|
| 4,178,046 A | 12/1979 | Silver | 384/103 |
| 4,195,395 A | 4/1980 | Silver | 29/898.02 |
| 4,475,824 A | 10/1984 | Glaser | 384/306 |
| 4,526,483 A | 7/1985 | Hishikawa | 384/106 |
| 4,552,466 A | 11/1985 | Warren | 384/103 |
| 4,616,388 A | 10/1986 | Soum | 29/898.02 |
| 4,950,089 A | 8/1990 | Jones | 384/103 |
| 5,102,236 A | * 4/1992 | Ide | 384/103 |
| 5,238,308 A | * 8/1993 | Lang et al. | 277/411 |
| 5,564,836 A | * 10/1996 | Ide et al. | 384/122 |
| 5,660,481 A | * 8/1997 | Ide | 384/122 |
| 5,772,334 A | * 6/1998 | Parkins et al. | 384/117 |

* cited by examiner

Primary Examiner—Jack Lavinder

(57) ABSTRACT

A foil journal bearing utilizes a plurality of piezoelectric actuators to increase the load carrying capacity of the bearing. The foil journal bearing is provided at an interior surface of its bearing housing with a plurality of foils or a top foil for supporting a rotating shaft The foil journal bearing includes a plurality of piezoelectric actuator devices embedded in an inside portion of the bearing housing while coming into contact with and supporting the foils or foil to increase stiffness and damping coefficient of the bearing at critical speeds of the rotating shaft. Each of the piezoelectric actuator devices is comprised of a piezoelectric actuator inserted into one of dimples formed on the interior surface of the bearing housing and provided with at least a piezoelectric actuating element and an elastic spring interposed between a bottom of the piezoelectric actuator and a bottom of the dimple, so as to increase stiffness and damping coefficient of the bearing by application of voltage to the piezoelectric actuator.

12 Claims, 5 Drawing Sheets

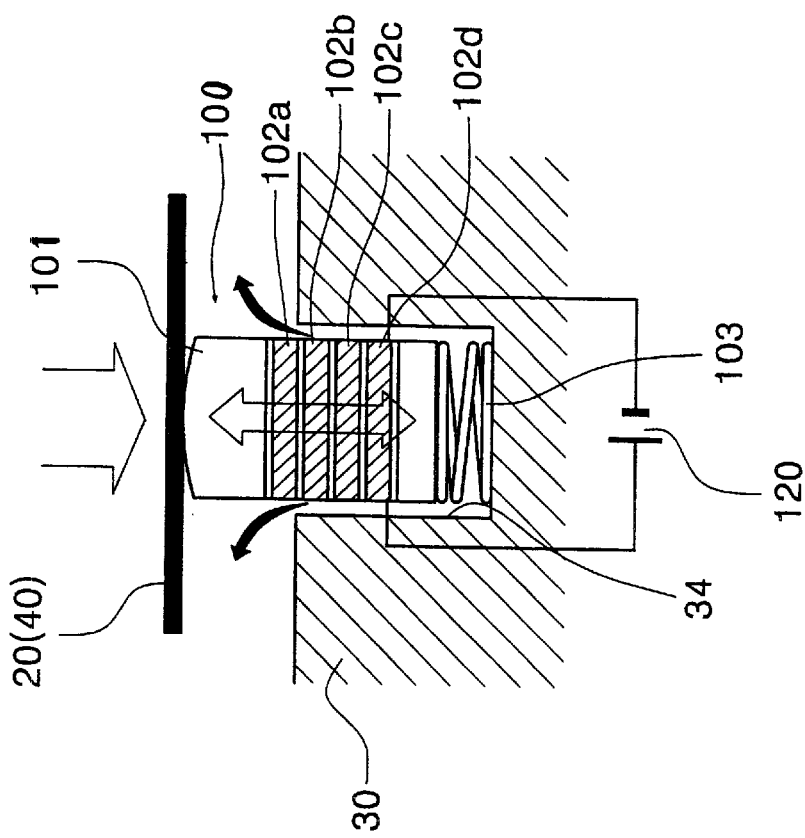
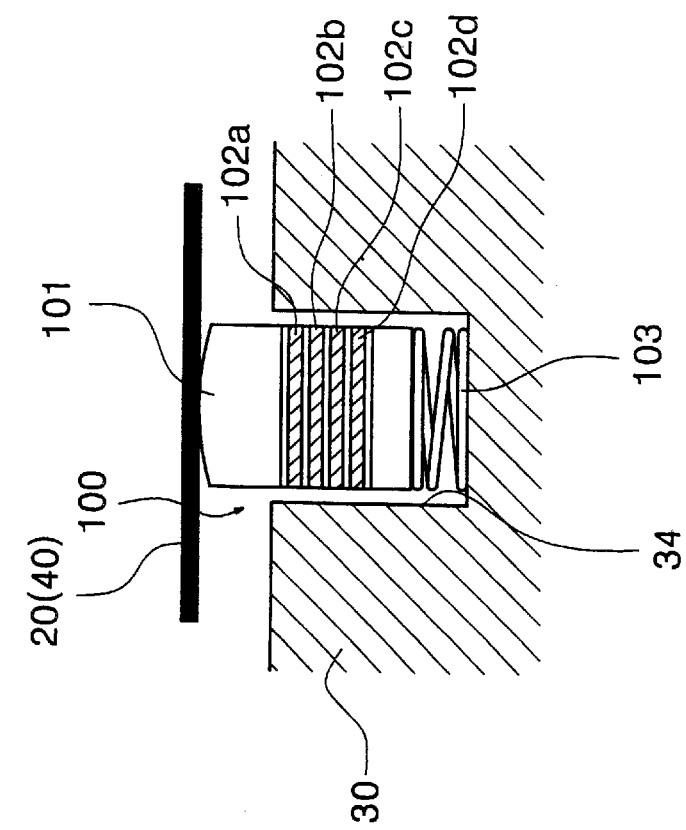

SMART FOIL JOURNAL BEARING WITH PIEZOELECTRIC ACTUATORS

BACKGROUND OF THE INVENTION

1. Field of the Invention

The present invention relates to air foil journal bearings for supporting shaft of a rotation system, and more particularly to a smart foil journal bearing with piezoelectric actuators, which is capable of increasing its load-carrying capacity and eliminating its operation instability by controlling the damping of vibrations at critical speed.

2. Description of the Prior Art

In general, a air foil journal bearing employs air as lubricating material instead of lubricating oil, and is a mechanical element suitable for a clean mechanical system. Such a foil journal bearing has a relatively wide area for supporting a rotating member in comparison with other bearings, thus having high reliability. Therefore, the foil journal bearing can be utilized as a supporting bearing for small, general aerial gas turbine engines, turbo expanders, various aerospace auxiliary power units, land transportation means, vapor cycle centrifugal compressors, and various commercial air compressors.

The air foil bearing should be designed to have load-carrying capacity and stability, and to withstand wear due to unstable contact between a shaft and a bearing during its start and stop.

FIG. 1 is a sectional view of a conventional multi-leaf foil journal bearing. A plurality of slots 32 are formed on the inner surface of a bearing housing 30 while being spaced apart from one another. A plurality of foils 20 are fixed by the slots 32, and support a shaft 10. The conventional multi-leaf foil journal bearing can increase hydrodynamic stiffness by increasing the thickness of the foils 20. However, the conventional multi-leaf foil journal bearing is problematic in that the life span of the bearing is shortened by wear between the shaft 10 and the foils 20 due to relatively increased start torque. Additionally, the vibration control of the shaft 10 depends upon only the repulsive force of the foils 20, so that the load-carrying capacity of the bearing is restricted and the effective control the vibrations is difficult thereby causing the shaft 10 to be unstable when the shaft rotates fast This creates unstable contact between the foil journal bearing and the shaft 10.

FIG. 2 is a sectional view of a conventional bump foil journal bearing in which a top foil 40 and a bump foil 42 are positioned on the inner surface of a bearing housing 30 and support a shaft 10. The bump foil journal bearing can increase load-carrying capacity by the great stiffness of the bump foil 42. However, gas in the bump foil 42 that is elastically deformed by the load exerted on the shaft 10 leaks in axial direction of the shaft, thereby weakening the damping capacity of the bump foil journal bearing and, accordingly, causing the control of vibrations at a high-speed region to be difficult.

SUMMARY OF THE INVENTION

Accordingly, the main object of the present invention is to provide a foil journal bearing, in which a plurality of piezoelectric actuators are positioned to support the exterior surface of a foil to increase stiffness against shaft-supported load and damping capability at a high-speed region, thereby improving its load-carrying capacity, enabling the reduction of the vibration amplitude of the shaft, and eliminating the instability of the shaft at critical speeds.

In order to accomplish the above object, the present invention provides a foil journal bearing, which is provided at an interior surface of its bearing housing with a plurality of foils or a top foil for supporting a rotating shaft, comprising: a plurality of piezoelectric actuator devices embedded in an inside portion of the bearing housing while coming into contact with and supporting the foils or the foil to increase stiffness and damping coefficient of the bearing at critical speeds of the rotating shalt wherein each of the piezoelectric actuator devices is comprised of a piezoelectric actuator inserted into one of dimples formed on the interior surface of the bearing housing and provided with at least a piezoelectric actuating element and an elastic spring interposed between a bottom of the piezoelectric actuator and a bottom of the dimple, so as to increase stiffness and damping coefficient of the bearing by application of voltage to the piezoelectric actuator.

The foil journal bearing in accordance with the present invention has also a thrust which is a force of the direction of the shaft and effectively supports the loaded shaft. Therefore, the foil journal bearing has much more load-carrying capabilities to any direction. (i.e., to the radial and thrust directions).

BRIEF DESCRIPTION OF THE DRAWINGS

The above and other objects, features and other advantages of the present invention will be more clearly understood from the following detailed description taken in conjunction with the accompanying drawings, in which:

FIG. 5A is a sectional view of a piezoelectric actuator in accordance with the present invention;

FIG. 5B is a sectional view for explaining the operation of piezoelectric actuator.

DESCRIPTION OF THE PREFERRED EMBODIMENTS

Figure 1:
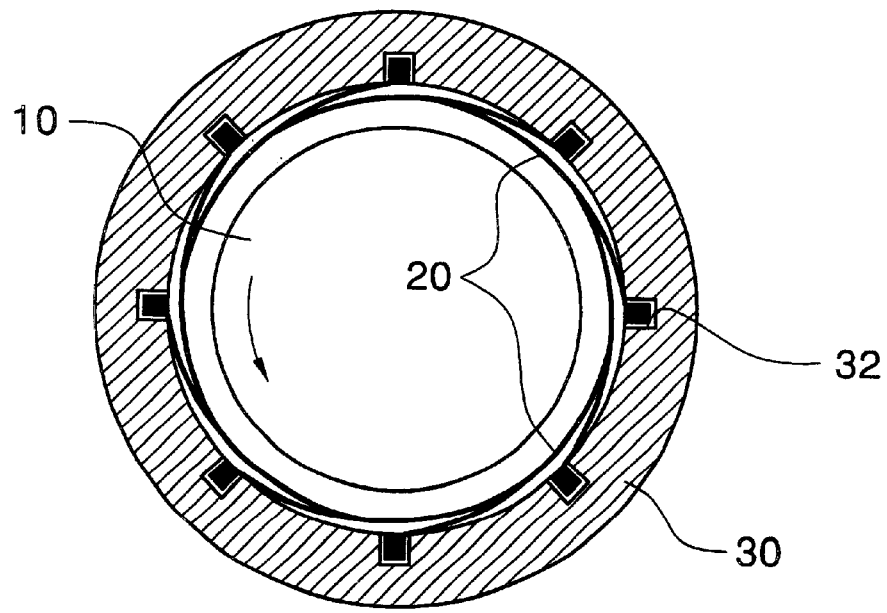
FIG. 1 is a sectional view of a conventional multi-leaf foil journal bearing.
Figure 2:
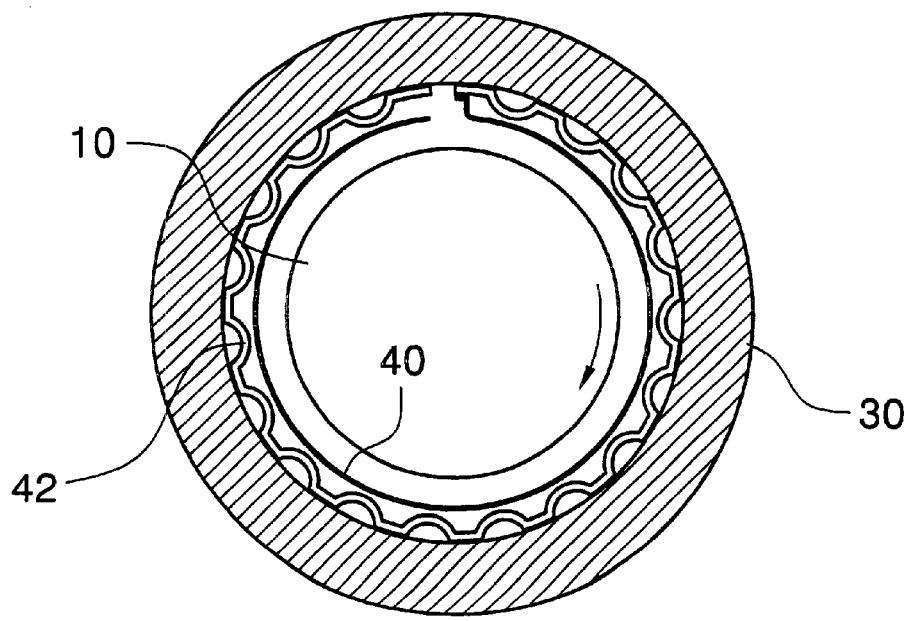
FIG. 2 is a sectional view of a conventional bump foil journal bearing.
Figure 3B:
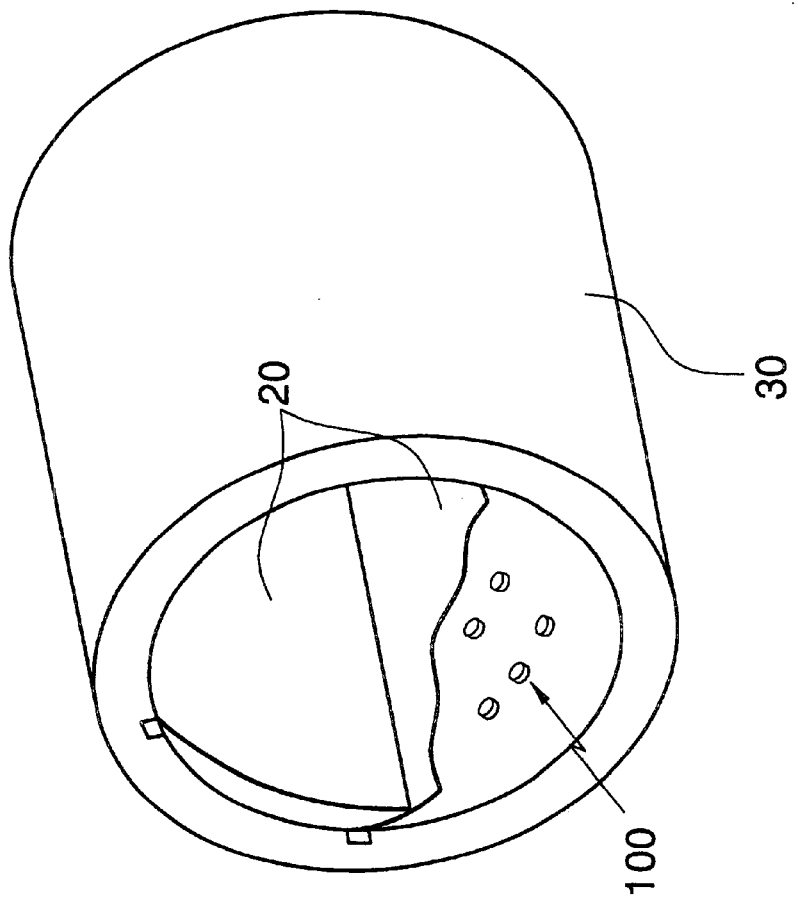
FIG. 3B is a perspective view of the foil journal bearing of FIG. 3A.
Figure 3A:
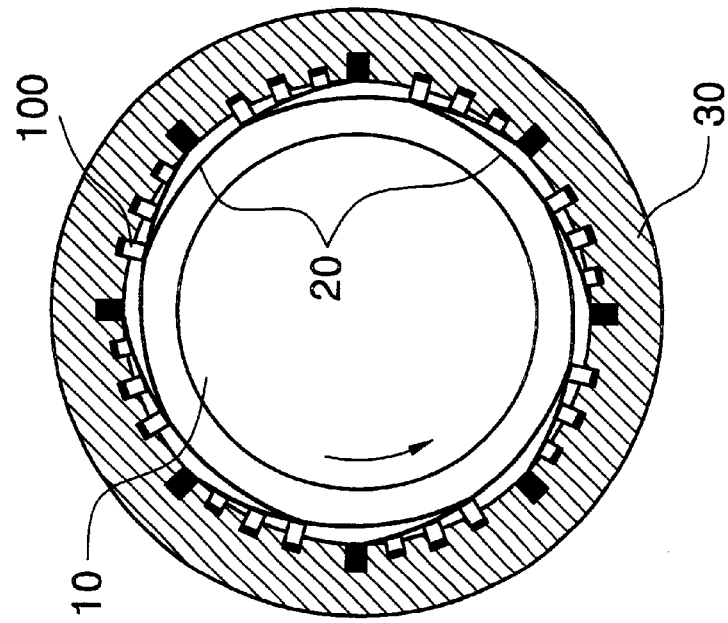
FIG. 3A is a sectional view of a foil journal bearing according to a first embodiment of the present invention.

FIGS. 3A is a sectional view of a smart foil journal bearing according to the first embodiment of the present invention and FIG. 3B is a perspective view of the foil journal bearing of FIG. 3A.

Shown as in the drawings, the smart foil journal bearing has a plurality of multi-leaf foil 20 arranged around the inner surface of the bearing housing 30 and piezoelectric actuator 100 supporting the multi-leaf foil 20. Here, the piezoelectric actuator 100 increases the stiffness for supporting the shaft and the attenuation force of the shaft.

Figure 4:
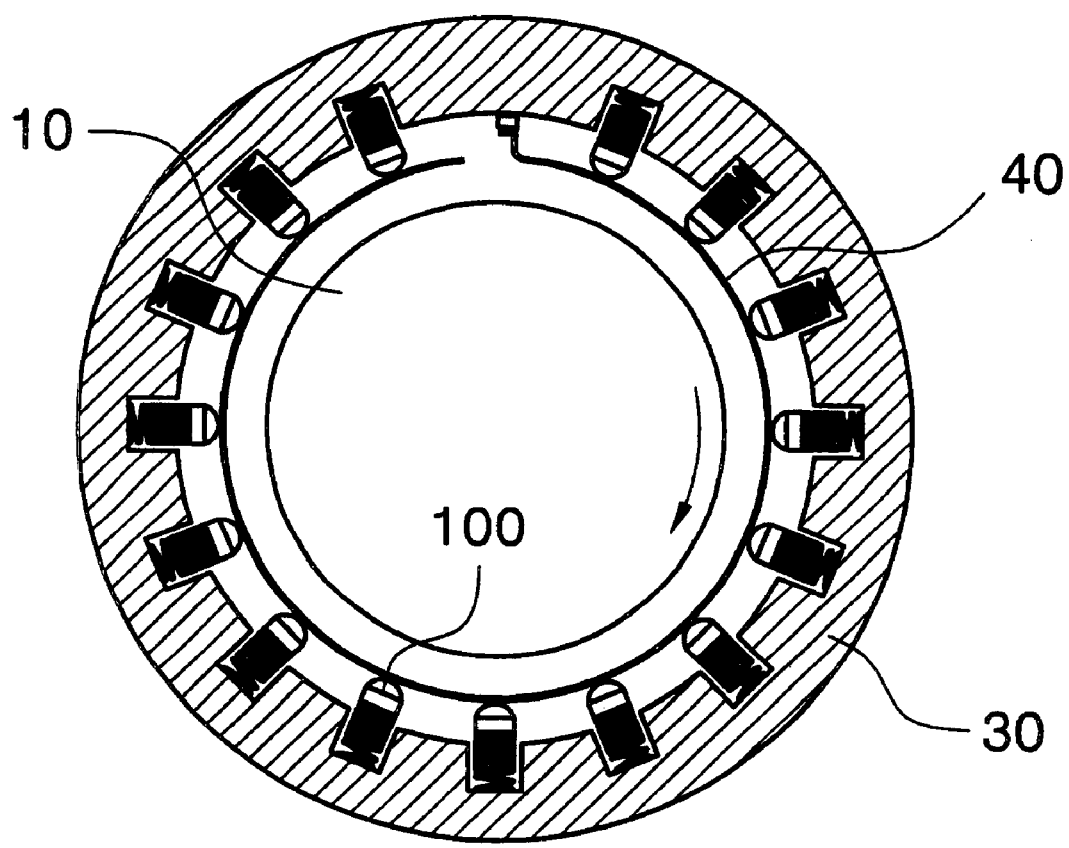
FIG. 4 is a sectional view a foil journal bearing according to a second embodiment of the present invention.

FIG. 4 is a sectional view a smart foil journal bearing according to the second embodiment of the present invention.

The top foil 40 plays a role to the multi-leaf foil of FIGS. 3A and 3B. The piezoelectric actuator 100 installed in the inner surface of the bearing housing supports a shaft 10 behind the top foil 40. Therefore, the smart foil bearing has a stiffness and supplies an attenuation force to the shaft 10.

FIG. 5A is a sectional view of a piezoelectric actuator in accordance with the present invention.

As illustrated in FIGS. 3A, 3B and 4, there is provided a smart foil journal bearing of the present invention in which a plurality of foils 20 or a foil 40 are arranged on the inner surface of the bearing housing 30 and a plurality of piezoelectric actuator 100 are embedded in the inner portion of the bearing housing 30 while coming into contact with and supporting the foils 20 or the foil 40.

Each of the piezoelectric actuator 100 includes a piezoelectric pin 101, a plurality of piezoelectric devices 102a, 102b, 102c and 102d, an elastic sprig 103. The piezoelectric devices are stacked with one on top of another and are to be more stacked. In this embodiment, the piezoelectric actuator 100 includes four piezoelectric devices 102a, 102b, 102c and 102d. Each piezoelectric actuator 100 is inserted into corresponding to dimple 34 regularly formed on the inner surface of the bearing housing 30. The spring is interposed between the bottom of the piezoelectric pin 101 and the bottom of the dimple 34. Here, the spring made of a thin plate (or a coil type spring) is employed to adjust the height of the piezoelectric actuator 100 according to the position of the corresponding portion of the foils 20 or the foil 40. The elastic spring 103 is preferably made of heat-resistant steel that has relatively low elasticity and thermal deformation.

FIG. 5B is a sectional view for explaining the operation of piezoelectric actuator.

In order to operate the piezoelectric actuator 100, it must be connected to a power source 120. When direct voltage from the power source 120 is applied to the piezoelectric actuator 100, the piezoelectric devices 102a through 102d of the piezoelectric actuator 100 is expanded to its axial and radial directions of the bearing (or the radial and axial directions of the piezoelectric devices). The axial displacement of the piezoelectric actuator 100 affects the position of the corresponding portion of the foils 20 or the foil 40, while the radial displacement of the piezoelectric actuator 100 is small in comparison with the axial displacement, but varies the gap between the outer surface of the piezoelectric actuator 100 and the sidewall of the dimple 34.

Figure 7:
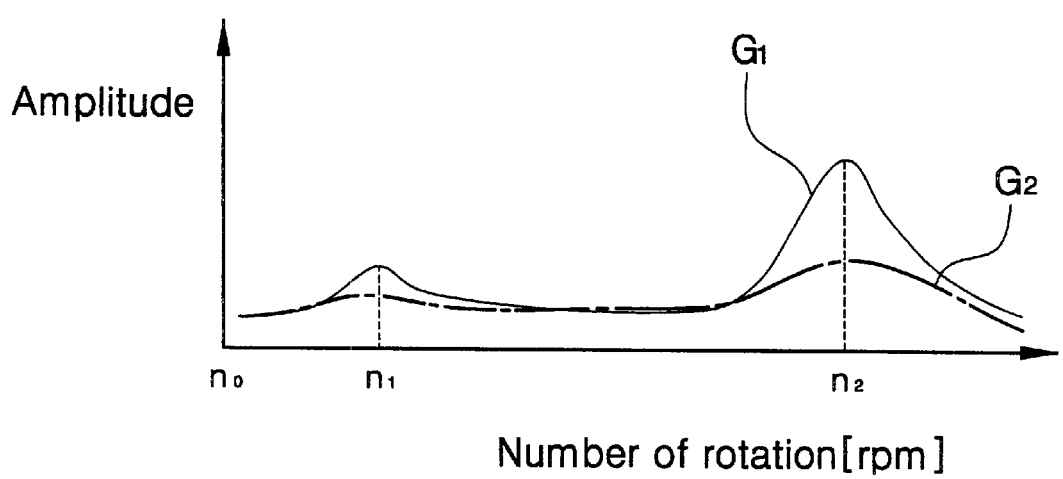
FIG. 7 is a graph showing the relationship between the rotating speed of the shaft and the vibration amplitude.

The moments when voltage is applied to the piezoelectric actuator 100 are illustrated in FIG. 7. That is, the moments are the time when the rotational speed of the bearing passes through the critical speed n1 of a rigid body mode and the critical speed n2 of the bending of the shaft 10. When voltage is applied at the moments, an amplitude reduction effect corresponding to a difference between a line G1 and a line G2 can be achieved.

Figure 6:
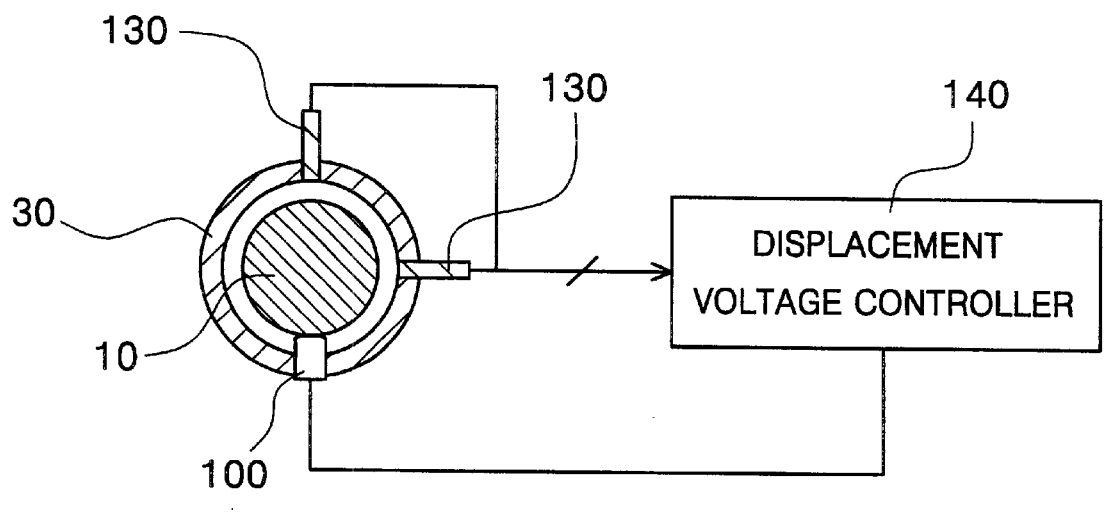
FIG. 6 is a schematic diagram showing the control of the foil journal bearing of the present invention.

FIG. 6 is a schematic diagram showing the control of the foil journal bearing of the present invention.

The smart foil journal bearing of the present invention includes a plurality of displacement sensors 1307 for example two, on the inner surface of the bearing housing 30 for detecting the gap between the shaft 10 and the bearing, and a voltage controller 140 for inputting the detected-signal from the displacement sensors 130, comparing gaps based on the detected signal with a predetermined signal corresponding to the gap value and outputting a controlling voltage. Then, the piezoelectric actuator 100 receives the controlling voltage from the voltage controller 140 and controls the gap or the position of the shift to be center of the bearing housing, even though the shaft shifts its position from the center, due to loads exerted on the shaft.

The foil journal bearing in accordance with the present invention has also a thrust which is a force of the direction of the shaft and effectively supports the loaded shaft. Therefore, the foil journal bearing has much more load-carrying capabilities to any direction. (i.e., to the radial and thrust directions).

Accordingly, in the smart foil journal bearing of the present invention, the stiffness of the bearing can be adjusted in its circumferential direction, so the load-carrying capacity of the bearing can be improved by applying high voltage in the direction of load application.

FIG. 7 is a graph showing the relationship between the rotating speed of the shaft and the vibration amplitude.

In a rigid body mode (rotational speed of n1) occurred at a relatively low speed of the shaft 10:

When the shaft 10 begins to rotate from an initial rotational speed n0 and reaches a critical speed n1, the shaft 10 rotates and vibrates with a large amplitude shown as graph G1. The vibration of the rotating shaft 10 is caused by its translation movement, and is principally affected by the stiffness and damping characteristics of two end support bearings.

However, the smart foil journal bearing of the present invention having the stiffness and carrying capacity for the load, as mentioned method above, can reduce the instability of the vibration shown as graph G2 at the critical speed n1.

In the bending mode (rotational speed of n2) occurred at a relatively high speed of the shaft 10:

Meanwhile, when the shaft 10 rotates more than the critical speed n1 and reach another critical speed n2, the shaft 10 rotates and vibrates with a relatively large amplitude shown as graph G1, comparing with that at the critical speed n1. The amplitude of the center of its shaft is greatest, it is most effective to give support to the center of the rotation shaft 10.

In that case, the smart foil-journal bearings of the present invention are situated to support both ends of the shaft 10. Therefore, it can eliminate the instability or imbalance of the shaft 10 causing by the vibrations at a relatively high speed.

Accordingly, the foil journal bearing of the present invention is considerably useful to machinery that require the increase of stiffness and damping capability when the rotating speed of their rotational shafts is greater than a critical speed, such as turbo machinery.

The support stiffness of the foils 20 or the foil 40 can be adjusted by varying the number of actuators 100 and the stiffness of elastic springs 110.

In the smart foil journal bearing of the present invention, there is formed a small gap between the outer surface of the piezoelectric actuator 100 and the sidewall of the dimple 34 so as to create a radial air flow according to a squeeze film phenomenon, as shown in FIG. 5A. The air flow generated around the piezoelectric actuator 100 damps vibrations in a high speed region.

As described above, the present invention provides a foil journal bearing utilizing piezoelectric actuators, which is capable of improving load-carrying capacity, which is capable of adjusting the stiffness and damping force of the bearing by detecting distance between a rotating shaft and each piezoelectric actuator and effectively operating the piezoelectric actuators, and which is capable of eliminating imbalance by controlling vibrations at critical speeds.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A smart foil journal bearing, which is provided at an interior surface of its bearing housing with a plurality of foils or a top foil for supporting a rotating shaft, comprising:
   a plurality of piezoelectric actuators embedded in an inside portion of the bearing housing while coming into contact with and supporting the foils or the foil to increase stiffness and damping coefficient of the bearing, wherein each of said piezoelectric actuator are comprised of a piezoelectric actuator inserted into one of dimples formed on the interior surface of the bearing housing and provided with at least a piezoelectric actuating element and an elastic spring interposed between a bottom of the piezoelectric actuator and a bottom of the dimple, so as to increase stiffness and damping coefficient of the bearing by application of voltage to said piezoelectric actuator.

2. The smart foil journal bearing according to claim 1, further comprising a plurality of displacement sensors mounted on an exterior surface of said bearing housing for detecting a gap between the shaft and the bearing and a voltage controller for comparing gaps detected by said displacement sensors and controlling voltage, so as to automatically adjust stiffness and damping coefficient of the bearing in a circumferential direction of the bearing.

3. The smart foil journal bearing according to claim 1, wherein said elastic spring is a coil spring made of a thin plate so as to adjust a height of the piezoelectric actuator according to a position of a corresponding portion of the foil.

4. The foil journal bearing according to claim 1, wherein said stiffness of said foils or top foil depend on the number of said actuators and/or the stiffness of said elastic springs.

5. The smart foil journal bearing according to claim 1, further comprising a small gap between an outer surface of said piezoelectric actuator and a sidewall of said dimple so as to create a radial air flow according to a squeeze film phenomenon.

6. The smart foil journal bearing according to claim 1, wherein said piezoelectric actuator is brought into contact with said multiple foils or top foil while being erected in a radial direction.

7. The smart foil journal bearing according to claim 1, wherein said piezoelectric actuator includes a plurality of piezoelectric devices, which are stacked with one on top of another.

8. A smart foil journal bearing for supporting a shaft, wherein the bearing comprising:
   a plurality of foils or one foil at an interior surface of the foil journal bearing housing; and
   a plurality of piezoelectric actuators supporting the foils or the one foil to increase stiffness and damping capacity of the bearing during rotation of said shaft;
   wherein each of said piezoelectric actuators comprising:
      a piezoelectric pin inserted into a dimple formed on the interior surface of the journal bearing housing;
      a plurality of piezoelectric devices stacked with one on top of another in the piezoelectric pin; and
      an elastic spring interposed between a bottom of the piezoelectric pin and a bottom of the dimple.

9. The foil journal bearing according to claim 8, wherein said elastic spring is a coil spring made of a thin plate so as to adjust a height of the piezoelectric pin according to a position of a corresponding portion of said foils or said one foil.

10. The foil journal bearing according to claim 8, wherein said the piezoelectric actuators are slidably and movably installed in the dimples with a small gap between an outer surface of said piezoelectric pin and a sidewall of said dimple so as to create a radial air flow to outside of the piezoelectric actuators from the spaces between the bottoms of the piezoelectric pins and the dimples.

11. The foil journal bearing according to claim 10, wherein said stiffness and damping capacity depend on the number of said piezoelectric actuators and an elastic constant of said elastic springs.

12. The foil journal bearing according to claim 11, wherein said stiffness and damping capacity further depend on pressure of air filling of the spaces between the bottoms of the piezoelectric pins and the dimples and/or friction force of the piezoelectric pin and sidewall of the dimple.

* * * * *

UNITED STATES PATENT AND TRADEMARK OFFICE
CERTIFICATE OF CORRECTION

PATENT NO. : 6,582,125 B1  Page 1 of 1
DATED : June 24, 2003
INVENTOR(S) : Yong Bok Lee et al.

It is certified that error appears in the above-identified patent and that said Letters Patent is hereby corrected as shown below:

<u>Title page,</u>
Add item:
-- [73] Assignee: Korea Institute of Science and Technology --

Signed and Sealed this

Sixth Day of April, 2004

JON W. DUDAS
*Acting Director of the United States Patent and Trademark Office*